(12) United States Patent
Wu

(10) Patent No.: US 7,162,497 B2
(45) Date of Patent: Jan. 9, 2007

(54) SYSTEM AND METHOD FOR SHARED DIRECTORY MANAGEMENT

(75) Inventor: Yu-Fu Wu, Chiai (TW)

(73) Assignee: Taiwan Semiconductor Manufacturing Co., Ltd., Hsin-Chu (TW)

( * ) Notice: Subject to any disclaimer, the term of this patent is extended or adjusted under 35 U.S.C. 154(b) by 801 days.

(21) Appl. No.: 09/983,804

(22) Filed: Oct. 25, 2001

(65) Prior Publication Data

US 2002/0184241 A1 Dec. 5, 2002

(30) Foreign Application Priority Data

May 31, 2001 (TW) .................. 90113218 A

(51) Int. Cl.
*G06F 17/30* (2006.01)
*G06F 7/00* (2006.01)
*G06F 12/00* (2006.01)

(52) U.S. Cl. ..................... 707/200; 707/8; 707/204
(58) Field of Classification Search ................ 707/200, 707/10, 104, 8, 204
See application file for complete search history.

(56) References Cited

U.S. PATENT DOCUMENTS

| | | | | |
|---|---|---|---|---|
| 5,537,574 A | * | 7/1996 | Elko et al. .................. 711/141 |
| 5,692,178 A | * | 11/1997 | Shaughnessy .................. 707/8 |
| 5,706,510 A | * | 1/1998 | Burgoon .................... 707/203 |
| 5,878,408 A | * | 3/1999 | Van Huben et al. ............ 707/1 |
| 5,884,298 A | * | 3/1999 | Smith et al. .................... 707/2 |
| 5,893,086 A | * | 4/1999 | Schmuck et al. ............... 707/1 |
| 5,918,229 A | * | 6/1999 | Davis et al. .................. 707/10 |
| 5,987,506 A | * | 11/1999 | Carter et al. ................ 709/213 |
| 6,047,289 A | * | 4/2000 | Thorne et al. ............... 707/10 |
| 6,101,508 A | * | 8/2000 | Wolff ........................ 709/223 |
| 6,144,999 A | * | 11/2000 | Khalidi et al. .............. 709/219 |
| 6,195,678 B1 | * | 2/2001 | Komuro ..................... 709/202 |
| 6,292,905 B1 | * | 9/2001 | Wallach et al. ................ 714/4 |
| 6,353,898 B1 | * | 3/2002 | Wipfel et al. ................ 714/48 |
| 6,412,079 B1 | * | 6/2002 | Edmonds et al. ............. 714/11 |
| 6,513,038 B1 | * | 1/2003 | Hasegawa et al. ............. 707/7 |
| 6,718,486 B1 | * | 4/2004 | Roselli et al. ................ 714/41 |
| 6,725,261 B1 | * | 4/2004 | Novaes et al. ............. 709/220 |

* cited by examiner

*Primary Examiner*—Jeffrey Gaffin
*Assistant Examiner*—Cindy Nguyen
(74) *Attorney, Agent, or Firm*—Birch,Stewart,Kolasch and Birch, LLP

(57) ABSTRACT

A shared directory management system includes a storage module, a first cluster server, a second cluster server, and a management module. In the normal mode, the first cluster server controls the storage module, the management module examines the storage module using a monitor method, and if the storage module was processed by an update action, the management module stores update setting information corresponding to the update action into a database. If failure occurs, the second clustered server controls the storage module, the management module returns the storage module according to the update setting information stored in the database, and switches back to the normal mode.

16 Claims, 2 Drawing Sheets

SYSTEM AND METHOD FOR SHARED DIRECTORY MANAGEMENT

BACKGROUND OF THE INVENTION

1. Field of the Invention

The present invention relates to a system and method for shared directory management, and particularly to a system and method for shared directory failover management in a clustered server system.

2. Description of the Related Art

Clustered server systems are systems that integrate several independent servers. When a failure, such as system crash or memory damage occur in any one of the servers, other servers in the cluster take over the work executed on the failed server, so that the whole system can continue to provide service without interruption.

The shared directory is also called a public directory, namely the shared resources in general computers. When the directory on disk is set in a shared resource state, the directory becomes a shared directory, and the shared directory can be accessed by the other users via networks.

In the conventional method for shared directory management in clustered server systems, there are two ways to manage the shared directory. The first method sets each of the shared directories as a cluster resource (using one resource per share). The cluster resource represents a component that can be taken over by other servers if a failover (the action in which a failure occurs in one clustered server and the other clustered servers take over the work of the failed clustered server) occurs. In this method, since each of the shared directories is set as a cluster resource, the shared directories can be taken over when a failover occurs.

However, the number of resources controlled by the clustered server has a maximum limitation in practice. For example, Windows 2000 Advanced Server can control at most 1600 cluster resources in theory, and Windows NT 4.0 Server Enterprise Edition can control at most 800 cluster resources. Further, when more cluster resources are used by the system, the time for failover execution is longer.

The second method is to use only one cluster resource (using shared sub-directory options). A cluster resource can be set to indicate a specific directory, and each of the sub-directories in this specific directory will be shared. Therefore, there is no problem with maximum limitations of cluster resources.

However, in this method, the setting information of each of the sub-directories, such as commentary, access authority, maximum users and the like are identical to the specific directory. To change the setting information of each of the sub-directories, the system must provide other management applications for manual setting, thus increasing management costs. As well, the setting information of the sub-directories will be lost after being taken over if a failover occurs, further increasing the management complexity.

SUMMARY OF THE INVENTION

It is therefore an object of the present invention to provide a system and method for shared directory management that uses a cluster resource to indicate a shared directory and each of the sub-directories in the shared directory has individual setting information. Furthermore, another object of the present invention is to provide a system and method for shared directory management that can automatically return to the original setting information if a failover occurs in the clustered server system.

To achieve the above object, the present invention provides a shared directory management system. The system includes a storage module, a first cluster server, a second cluster server, and a management module. The storage module includes a shared directory, wherein the shared directory includes a first setting information and a plurality of sub-directories, and each of the sub-directories includes a second setting information.

When the clustered server system is situated in a normal mode, the first cluster server controls the storage module, the management module examines the first setting information of the shared directory and the second setting information of each of the sub-directories in the storage module using a monitor method, and if the first setting information of the shared directory and the second setting information of the sub-directories are processed by an update action, the management module stores an update setting information corresponding to the update action into a database.

If a failure occurs, the second clustered server controls the storage module, and the management module returns the first setting information of the shared directory and the second setting information of the sub-directories according to the update setting information stored in the database, and switches back to the normal mode.

BRIEF DESCRIPTION OF THE DRAWINGS

The aforementioned objects, features and advantages of this invention will become apparent by referring to the following detailed description of the preferred embodiment with reference to the accompanying drawings, wherein.

DETAILED DESCRIPTION OF THE PREFERRED EMBODIMENT

Referring to the accompanying figures, the preferred embodiments according to the present invention follow.

Figure 1:
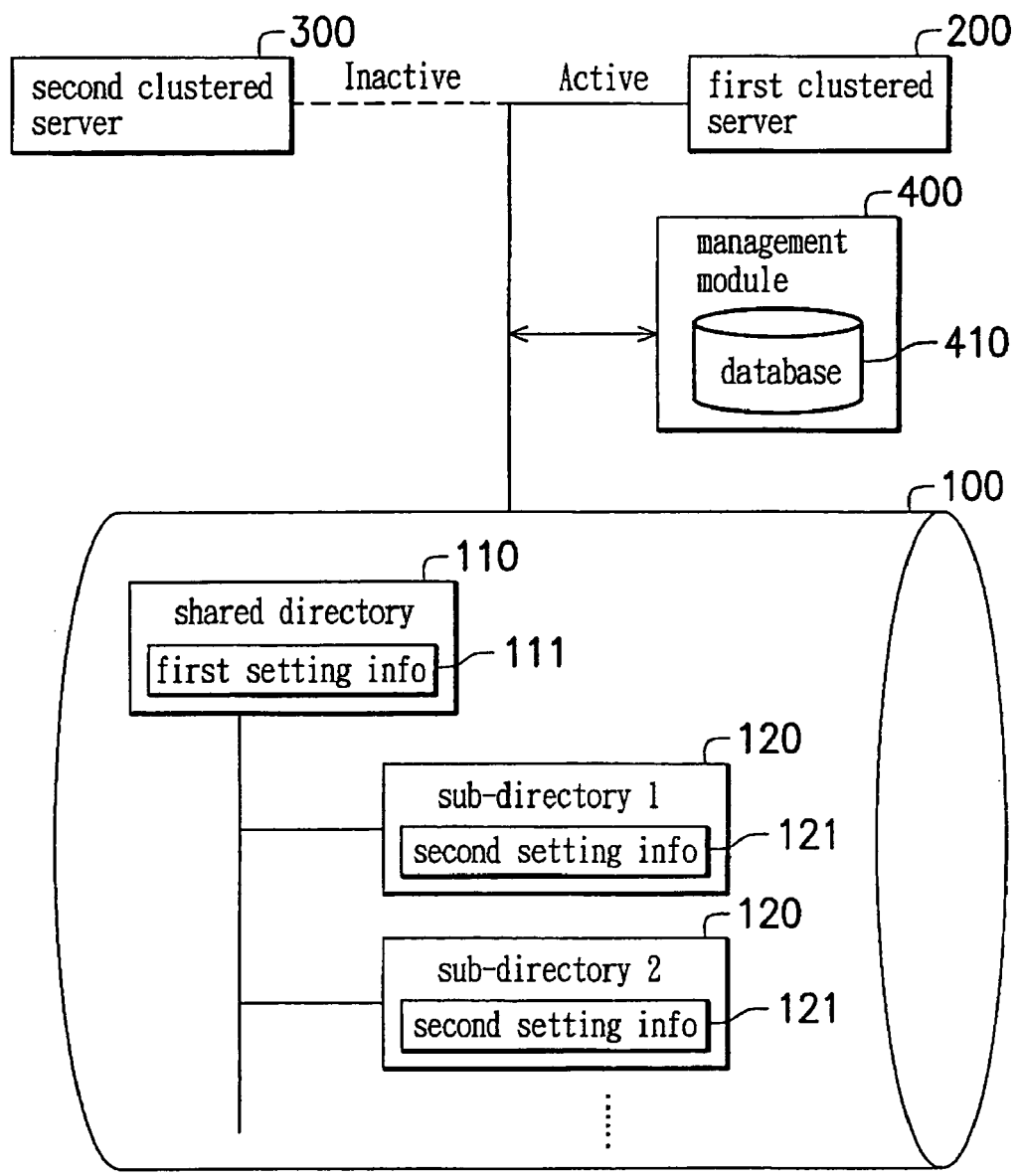
FIG. 1 is a schematic diagram showing the architecture of the shared directory management system according to the embodiment of the present invention.

FIG. 1 shows the architecture of the shared directory management system according to the embodiment of the present invention. The shared directory management system according to the embodiment of the present invention includes a storage module 100, a first cluster server 200, a second cluster server 300, and a management module 400. The management module 400 is a cluster resource.

The storage module 100 includes at least one shared directory 110, wherein the shared directory 110 includes a first setting information 111 and a plurality of sub-directories 120, and each of sub-directories 120 includes a second setting information 121. The first setting information 111 and the second setting information 121 may include commentary, access authority, maximum users, and the like.

The storage module 100 may be a disk drive, and the storage module 100 may be a cluster resource commonly controlled by the first cluster server 200 and the second cluster server 300. In the normal mode, the first cluster server 200 controls the storage module 100 and the management module 400, and the second clustered server 300 takes over to control the storage module 100 and the management module 400 if a failure occurs in the first cluster server 200.

Further, in the normal mode, the management module 400 examines the first setting information 111 of the shared directory 110 and the second setting information 121 of each of the sub-directories 120 in the storage module 100 using a monitor method, and if the first setting information 111 of the shared directory 110 and the second setting information 121 of the sub-directories 120 are processed by an update action, the management module 400 stores an update setting information corresponding to the update action into a database 410.

Wherein, the update action may be create, delete, and modify for these directories or setting information. The monitor method may be pooling to scan these directories and setting information at a predetermined interval. The monitor method may be also event triggering from an operating system (not shown in FIG. 1) in the first cluster server 200 to inform the management module 400 about an update action if the update action occurs.

If a failure occurs, the second clustered server 300 controls the storage module 100 and the management module 400, then the management module 400 returns the first setting information 111 of the shared directory 110 and the second setting information 121 of the sub-directories 120 in the storage module 100 according to the update setting information stored in the database 410. If the recovery is finished, then the second clustered server 300 switches back to the normal mode and the management module 400 continues to examine the storage module 100.

Figure 2:
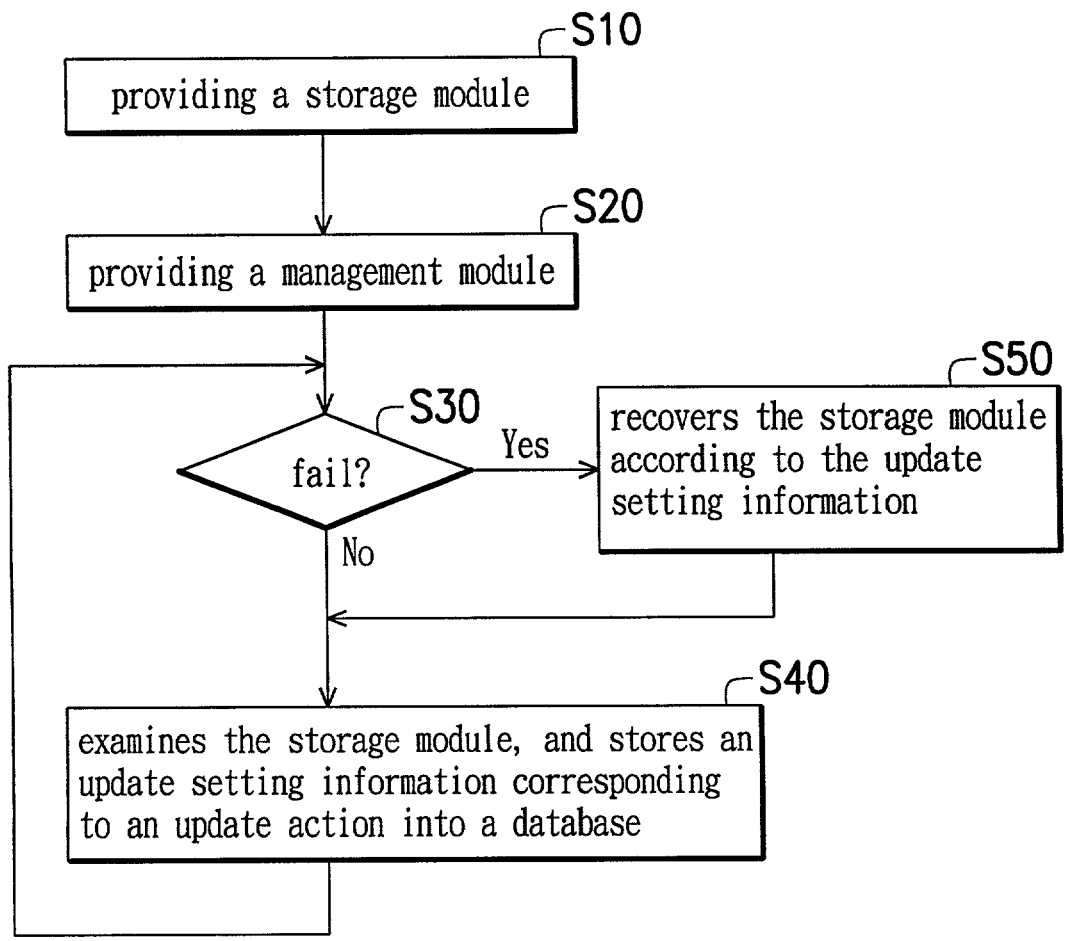
FIG. 2 is a flow chart illustrating the operation of the shared directory management method according to the embodiment of the present invention.

Next, FIG. 2 illustrates the operation of the shared directory management method according to the embodiment of the present invention. Referring to FIG. 1 and 2, the shared directory management method according to the embodiment of the present invention follows.

The shared directory management method according to the embodiment of the present invention is suitable for use in a system having a first clustered server 200 and a second clustered server 300. First, a storage module 100 including at least one shared directory 110 is provided(step S10). Wherein the shared directory 110 includes a first setting information 111 and a plurality of sub-directories 120, and each of the sub-directories 120 includes a second setting information 121. The first setting information 111 and the second setting information 121 may include commentary, access authority, maximum users, and the like.

A management module 400 is also provided(step S20), determining whether a failure occurs (step S30). If there is no failure, the management module 400 examines the first setting information 111 of the shared directory 110 and the second setting information 121 of each of the sub-directories 120 in the storage module 100 using a monitor method, and if the first setting information 111 of the shared directory 110 and the second setting information 121 of the sub-directories 120 are processed by an update action, such as create, delete, or modify for these directories or setting information, the management module 400 stores an update setting information corresponding to the update action into a database 410 (step S40). Then the process returns to step 30 to determine whether a failure occurs.

The monitor method may be pooling to scan these directories and setting information at a predetermined interval. The monitor method may also be event-triggered from an operating system (not shown) in the first cluster server 200 to inform the management module 400 about a update action if the update action occurs.

In addition, if a failure occurs, the second clustered server 300 controls the storage module 100 and the management module 400, then the management module 400 returns the first setting information 111 of the shared directory 110 and the second setting information 121 of the sub-directories 120 in the storage module 100 according to the update setting information stored in the database 410 (step S50). If the recovery is finished, then the second clustered server 300 switches back to the normal mode and the management module 400 continues to examine the storage module 100 as in step 40.

As a result, the shared directory management system and method of the present invention uses a cluster resource to indicate a shared directory and each of the sub-directories in the shared directory has individual setting information, and can automatically return to the original setting information if a failover occurs in the clustered server system.

Although the present invention has been described in its preferred embodiment, it is not intended to limit the invention to the precise embodiment disclosed herein. Those who are skilled in this technology can still make various alterations and modifications without departing from the scope and spirit of this invention. Therefore, the scope of the present invention shall be defined and protected by the following claims and their equivalents.

What is claimed is:

1. A shared directory management system, comprising:
   a storage module having a shared directory that includes a first setting information and a plurality of sub-directories, each of the sub-directories having a second setting information;
   a management module for examining the first setting information of the shared directory and the second setting information of the sub-directories in the storage module using a monitor method in a normal mode, storing an update setting information corresponding to an update action into a database if the first setting information of the shared directory and the second setting information of the sub-directories are processed by the update action, and when a failure occurs, returning the first setting information of the shared directory and the second setting information of the sub-directories in the storage module to the original first and second setting information before the failure according to the update setting information stored in the database;
   a first clustered server for controlling the storage module and the management module in the normal mode and after the finish of returning the first setting information and the second setting information; and
   a second clustered server for controlling the storage module and the management module when the failure occurs.

2. The system as claimed in claim 1 wherein the storage module is a disk drive.

3. The system as claimed in claim 1 wherein the first setting information and the second setting information comprise commentary, access authority and maximum users.

4. The system as claimed in claim 1 wherein the monitor method is pooling.

5. The system as claimed in claim 1 wherein the monitor method is event-triggered.

6. The system as claimed in claim 1 wherein the update action is create.

7. The system as claimed in claim 1 wherein the update action is delete.

8. The system as claimed in claim 1 wherein the update action is modify.

9. A method of managing shared directory in clustered server system, comprising the steps of:

providing a storage module comprising at least one shared directory, wherein the shared directory comprises a first setting information and a plurality of sub-directories, and each of sub-directories comprises a second setting information; and providing a management module, wherein, the management module examines the first setting information of the shared directory and the second setting information of the sub-directories in the storage module using a monitor method in a normal mode, stores a update setting information corresponding to a update action into a database if the first setting information of the shared directory and the second setting information of the sub-directories are processed by the update action, and when a failure occurs, returns the first setting information of the shared directory and the second setting information of the sub-directories in the storage module to the original first and second setting information before the failure according to the update setting information stored in the database.

10. The method as claimed in claim 9 wherein the storage module is a disk drive.

11. The method as claimed in claim 9 wherein the first setting information and the second setting information comprise commentary, access authority and maximum users.

12. The method as claimed in claim 9 wherein the monitor method is pooling.

13. The method as claimed in claim 9 wherein the monitor method is event-triggered.

14. The method as claimed in claim 9 wherein the update action is create.

15. The method as claimed in claim 9 wherein the update action is delete.

16. The method as claimed in claim 9 wherein the update action is modify.

* * * * *